A. BONOM.
CLUTCH.
APPLICATION FILED NOV. 14, 1913.

1,129,784.

Patented Feb. 23, 1915.
2 SHEETS—SHEET 2.

WITNESSES
Edw. Thorpe
B. Joffe

INVENTOR
Alfred Bonom
BY
ATTORNEYS

UNITED STATES PATENT OFFICE.

ALFRED BONOM, OF PATERSON, NEW JERSEY.

CLUTCH.

1,129,784.

Specification of Letters Patent.    Patented Feb. 23, 1915.

Application filed November 14, 1913. Serial No. 800,939.

*To all whom it may concern:*

Be it known that I, ALFRED BONOM, a citizen of France, and a resident of Paterson, in the county of Passaic and State of New Jersey, have invented a new and Improved Clutch, of which the following is a full, clear, and exact description.

The invention relates to clutches, and has reference more particularly to a clutch whereby the transmission from one shaft to another is first obtained by a frictional engagement of means carried by said shafts and then by bringing in engagement means adapted to transmit positively the motion of one shaft to the other and thus not depend on the frictional engagement of the parts.

The invention also relates to clutches whereby motion can be transmitted independently to a shaft from two oppositely rotating shafts without any risk of damaging the transmitting mechanism or the rotating part.

The invention further relates to clutches whereby a shaft positively driven in a predetermined direction is gradually brought to a standstill by means of the frictional parts of the clutch, then its motion reversed to about the speed of the new driving member, and then a positive connection established between said driving and driven members, thereby eliminating danger of slipping between the frictional parts of the clutch.

An object of the invention is to obtain a simple, efficient and strong transmission clutch whereby a shaft rotating in a predetermined direction can be quickly and safely reversed.

A further object of the invention is to construct a clutch whereby the movement of one shaft to another shaft is transmitted by means interlocking each other, thereby transmitting the motion positively.

I obtain the above objects by providing a clutch having a pair of members adapted to rotate in opposite directions and independently frictionally engage a member positioned therebetween so as to rotate the said last member in either direction by its frictional engagement with either of the first mentioned members. The last member is provided with means whereby the same is positively connected to either of the first members after it is frictionally engaged to either of said members, and thereby the transmission of motion from either of said rotating members does not depend on the frictional engagement.

The invention consists of the construction and combination of parts to be more fully described hereinafter and fully set forth in the claims.

Figure 1:
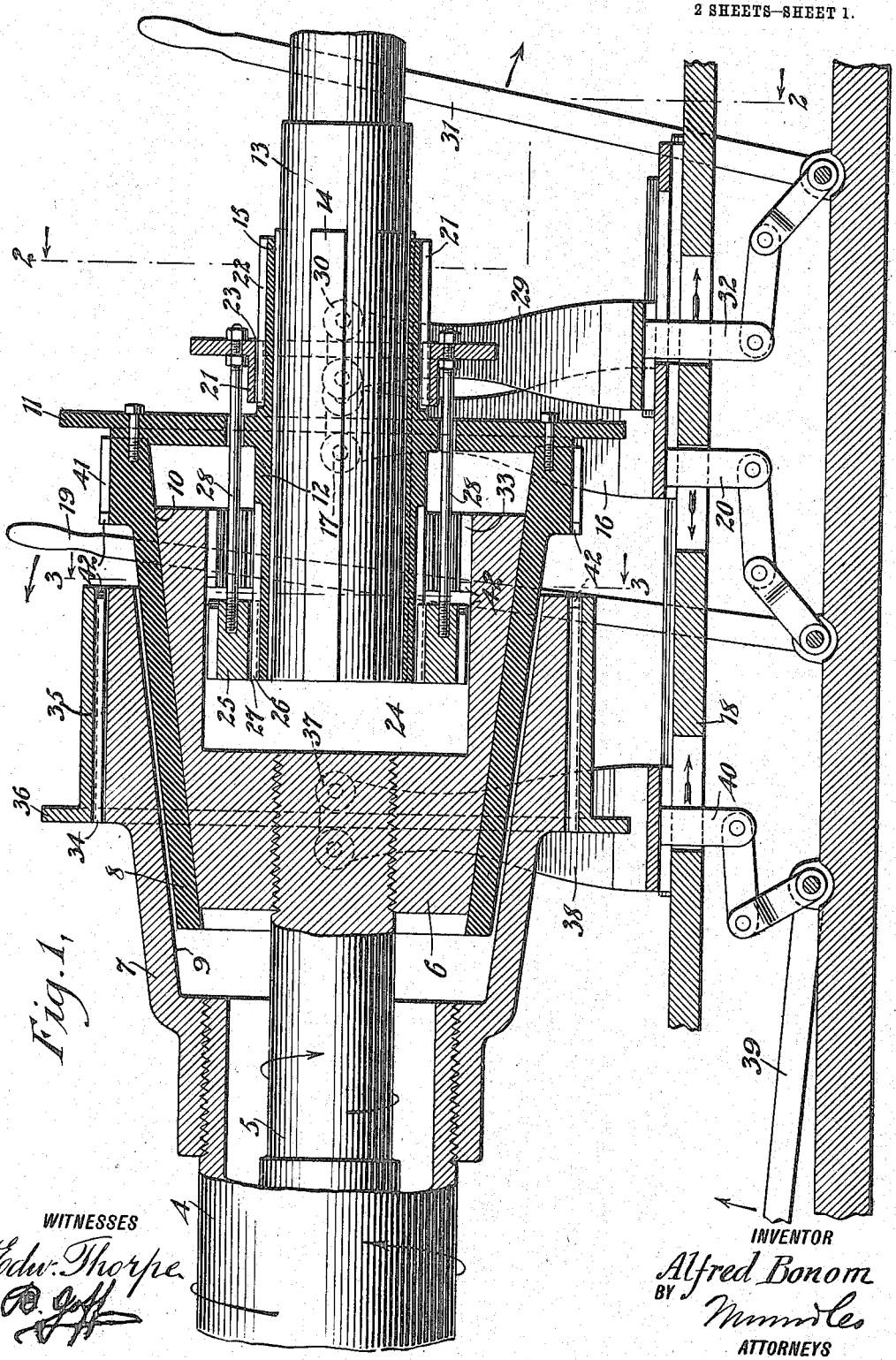
Figure 2:
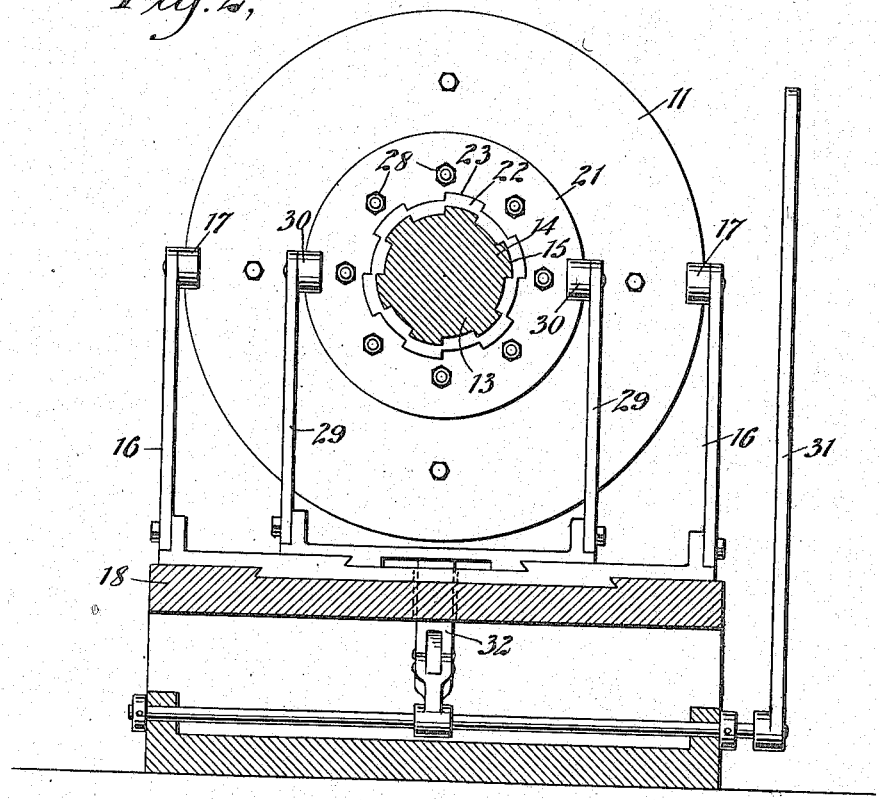
Figure 3:
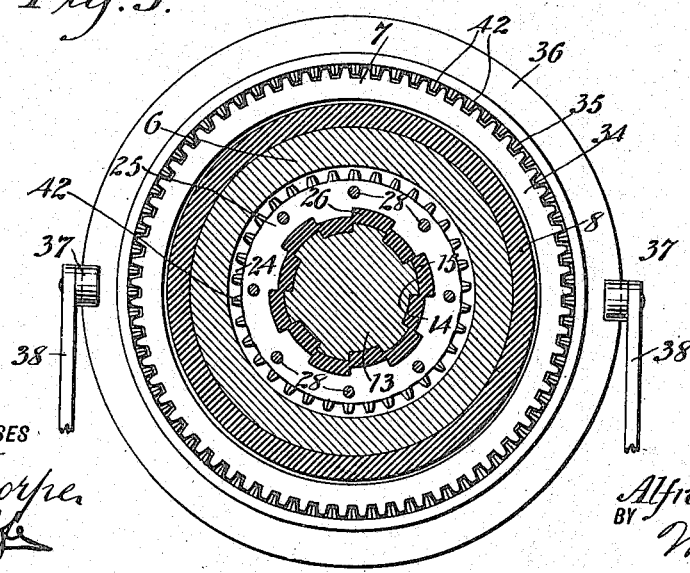

Reference is to be had to the accompanying drawings forming a part of this specification, in which like characters indicate corresponding parts in all the views and in which:

Figure 1 is a longitudinal vertical section of a clutch embodying my invention; Fig. 2 is a section on line 2—2, Fig. 1; and Fig. 3 is a section on line 3—3, Fig. 1.

While the clutch herein disclosed is described in connection with a turbine, the same can be as efficiently used with any motor having two concentric shafts adapted to rotate in opposite directions and wherethrough the motion can be transmitted to a single shaft from either of said concentric shafts.

Referring more particularly to the drawings, 4 represents a hollow shaft driven in the direction of the arrow, as shown in Fig. 4, by the outer shell of the turbine and the inner solid shaft 5 concentric with the hollow shaft 4 driven in the opposite direction by the inner rotor of the turbine, as shown by the arrow in Fig. 1. Secured to the end of the solid shaft 5 is a member 6 having the shape of the frustum of a cone converging toward the shaft. The hollow shaft 4 is provided at the extremity with a bell-shaped member 7 concentric with the member 6, and the inclined cone-shaped lateral surface is preferably the same as the outer cone-shaped surface of the member 6. The said members 6 and 7 are adapted to rotate with their respective shafts but cannot move axially. Positioned intermediate the bell-shaped member 7 and the member 6 is a cone-shaped sleeve 8, the outer conical surface of which is adapted to come in engagement with the inner surface 9 of the bell-shaped member 7, while the inner cone-shaped surface of the sleeve 8 is adapted to engage the outer cone-shaped surface 10 of the member 6. The cone-shaped sleeve 8 at its base, which normally lies beyond the base of the member 6, is positively secured to a circular flange 11 in any suitable way, thereby being reinforced at the base by said flange. Said flange 11 forms an integral part of a cylindrical sleeve 12 mounted to slide on a shaft 13 but constrained to rotate therewith. The shaft 13, which is axial with the two concentric shafts 4 and 5, has at its end engaging the sleeve a series of keys 14 integral therewith and uniformly distributed on the lateral surface thereof and engaged by corresponding keyways 15 provided in the sleeve 12. This structure permits the axial translation of the sleeve 8 on the shaft 13 by means of a standard 16, provided with rollers 17 at its upper end, engaging the faces of the flange 11 adjacent its periphery at opposite sides. Said standard 16 is mounted to slide in a base 18 parallelly to the axis of rotation by means of a system of levers 19 connected to an extension 20 of the standard passing through said base.

A flanged sleeve 21 is mounted to slide on a portion of sleeve 12 exterior to the cone sleeve 8, but constrained to rotate therewith. The translation of said sleeve 21 on the said portion of sleeve 12 is obtained by the provision of keys 22 uniformly distributed on the said portion of the sleeve and engaged by corresponding keyways 23 in said sleeve. See Fig. 2. The portion of the sleeve 12 within the cone sleeve 8 enters a recess 24 provided in the member 6. The said portion of the sleeve 12 is provided adjacent the end with a gear 25 mounted to slide on said portion of the sleeve 12 but constrained to rotate therewith by the provision of keys 26 similar to keys 22 and similarly engaged by keyways 27 in said gear 25. The gear 25 is connected to the flange portion of the sleeve 21 by means of a series of bolts 28 (see Figs. 1 and 2) and is adapted to slide on the sleeve 12 when said sleeve 21 is moved by means of the standard 29 engaging the faces of the flanged portion of the sleeve 21 by means of oppositely disposed rollers 30, said bolts 28 passing freely through apertures 28′ provided in the flange 11 of the sleeve 12. The standard 29 is mounted to slide in the base of the standard 16 and is actuated by a system of levers 31 connected to an extension 32 projecting through the base of the standard 16 and the clutch base 18. It is understood that when the standard 16 is moved on the base 18, the standard 29 remains immovable relative to the clutch base 18, as its movement is normally prevented by the system of levers 31.

The recess 24 of the member 6 adjacent the base is provided interiorly with a toothed surface 33 forming an interior gear with which the gear 25 is adapted to mesh when the sleeve 21 is moved by means of the system of levers 31 in the direction of the arrow adjacent said lever, shown on Fig. 1. The bell-shaped member 7, on its outer lateral surface adjacent its base, is provided with an indented surface forming an exterior gear 34. Meshing with said exterior gear 34 is an interior gear 35 provided with a flanged portion 36 connected by oppositely disposed rollers 37 of a standard 38. The said standard is mounted to slide on the clutch base 18 by means of a system of levers 39 engaging an extension 40 of the standard 38 projecting through the base 18. The exterior lateral surface at the base of the cone sleeve 8 is provided with an indented surface 41 similar to the exterior gear 34, and, therefore, adapted to mesh with the interior gear 35.

To transmit the rotary movement to the shaft 13 from either of the shafts 4 or 5 by means of the clutch as herein described, the cone sleeve 8 is first brought into engagement either with the member 6 or the member 7, according in which direction the shaft 13 is to be rotated. As shown in Fig. 1, the cone-shaped sleeve 8 is moved to frictionally engage the member 6 and, therefore, the shaft 13 will gradually pick up the speed of the shaft 5, and then by moving the system of levers 31, the gear 25 can be made to engage the toothed surface 33 of the said member. This will make a positive connection between the shaft 5 and the shaft 13. That is to say, there will be no chance for slipping between the shafts 13 and 5.

Let us assume now that it is desired to reverse the movement of the shaft 13, that is, that it is desired to connect it with the outer or hollow shaft 4, in which case the gear 25 is first disengaged from the toothed surface 33, then the cone-shaped sleeve 8 is disengaged from the member 6 by means of the system of levers 19 and gradually brought in engagement with the rotating bell-shaped member 7. The frictional engagement between the outer surface of the sleeve 8 with the inner surface of the bell-shaped member 9 will bring the shaft 13 gradually to a standstill and then reverse its motion until the same picks up the speed of the said shaft 4, when by means of the system of levers 39 the interior gear 35 is moved to mesh with the indented surface 41 of the sleeve and thereby a positive connection is established by means of the interior gear 35 between the shafts 4 and 13. Here, again, the chance of slipping between the shafts is eliminated by the said positive engagement. It is understood that, if desired, after the shaft 13 is engaged to either the inner or outer shaft, the frictional contact can be reduced between the members by means of the system of levers 19.

From the above description it is seen that the reverse of the shaft is obtained by the frictional engagement of the parts, but the driving from one shaft to the other is obtained by means of interengaging parts making this transmission between the shafts positive and not depending on frictional resistance. This reversal by means of the frictional resistance being gradual, eliminates all shocks and therefore reduces the danger of injury to rotating parts of the machinery.

The engaging ends of the teeth of the interior and exterior gears are sharpened so as to facilitate their engagement, indicated on the drawings by reference 42. It is evident that various changes might be made and modifications resorted to in the form, construction and arrangement of the parts described without departing from the spirit and scope of my invention, therefore I do not wish to limit myself to the exact construction shown.

Having thus described my invention, I claim as new and desire to secure by Letters Patent:

1. In a reversible clutch,—two concentric driving shafts adapted to rotate in opposite directions; a driven shaft axial with said shafts; frictional members associated with the driving shafts; a frictional member on the driven shaft positioned between the frictional members of the driving shafts, the said frictional member being mounted to rotate with the driven shaft and slide thereon, whereby said driven shaft can be frictionally engaged to either of said shafts; and means associated with said frictional members of the said shafts whereby the driven shaft can be positively engaged to either of the driving shafts after the same has been frictionally engaged thereto.

2. In a clutch,—frictional members adapted to rotate in opposite directions; a frictional member between said frictional members; means for engaging said latter member independently with each of the first frictional members; positive transmission means mounted to slide on said second mentioned frictional member and constrained to rotate therewith; positive transmission means associated with each of the first mentioned frictional members, each of said last mentioned means being adapted to be engaged independently and after the corresponding first mentioned frictional means have been engaged by said second mentioned frictional means.

3. In a clutch, two concentric driving shafts adapted to rotate in opposite directions, a driven shaft axial with said driving shafts, a frictional member carried by each of the driving and driven shafts, means for engaging the frictional member of the driven shaft with the frictional member of either the driving shafts, whereby a slippable connection between the driven and the driving shafts is obtained, positive transmission means associated with the frictional member of the driven shaft, positive transmission means on each of said frictional members of said driving shafts, and means for connecting either of said last mentioned positive transmission means with the positive transmission means associated with the frictional member of the driven shaft.

4. In a clutch,—two concentric driving shafts, one within the other; a frictional member associated with each of said shafts; a driven shaft axial with said driving shafts; a frictional member positioned between the other frictional members mounted to slide on said driven shaft and constrained to rotate therewith; means for moving said transmission member on said driven shaft whereby the same can be frictionally engaged to either of the driving shafts; positive transmission means slidably mounted on said frictional member of said driven shaft and constrained to rotate therewith, said transmission member of said inner driving shaft having positive transmission means adapted to be engaged by the above mentioned positive transmission means after the said frictional member of said driven shaft has been engaged with the frictional member of the inner driving shaft; and positive transmission means mounted to slide on the frictional member on the outer driving shaft and constrained to rotate therewith, said transmission member of the driven shaft having positive transmission means adapted to be engaged by the positive transmission means of the outer driven shaft after said transmission member of the driven shaft has engaged the transmission member of the outer driving shaft.

5. In a clutch,—a pair of concentric driving shafts adapted to rotate in opposite directions; a bell-shaped frictional member associated with the outer shaft; a cone-shaped frictional member associated with the inner shaft; a driven shaft; a cone-shaped frictional sleeve between said bell-shaped and cone-shaped frictional members; means connecting the sleeve to the driven shaft whereby said sleeve is adapted to slide axially on the driven shaft and constrained to rotate therewith; means for operating the sleeve on the driven shaft whereby the sleeve when engaging one of the frictional members on said driving shafts disengages the other of said frictional members; a member mounted to move relatively to the sleeve but constrained to rotate therewith; a gear carried by said member; an interior gear formed in said cone-shaped member adapted to be engaged by the first gear, whereby a positive transmission from the inner driving shaft to the driven shaft is obtained; a gear formed on the bell-shaped member; a gear sleeve meshing with said gear and slidably mounted thereon; and a gear formed on said cone-shaped sleeve adapted to be engaged by said gear sleeve whereby a positive transmission from the outer shaft to the driven shaft is obtained.

6. In a reversible clutch, a pair of concentric driving shafts adapted to rotate in opposite directions, a driven shaft axial with said shafts, a frictional member carried by said shafts, the frictional member of the driven shaft being mounted to slide thereon, positive transmission means mounted to slide on said frictional member of the driven shaft and constrained to rotate therewith, the frictional member of one of said driving shafts having positive transmission means adapted to be engaged by the first mentioned positive transmission means, whereby a positive transmission is established between said driving and driven shafts, and positive transmission means mounted to slide on the other frictional member of the other driving shaft and constrained to rotate therewith, said frictional member of the driven shaft having positive transmission means adapted to be engaged by the positive transmission means on said driving shaft, whereby a positive transmission is obtained between said driven and driving shafts.

7. In a reversible clutch,—two concentric driving shafts adapted to rotate in opposite directions; a driven shaft; frictional members associated with said shafts; means for an independent engagement of the frictional member of the driven shaft with either of the frictional members of the driving shafts, and means associated with said frictional members of said shafts whereby the driven shaft can be positively engaged to either of the driving shafts after the driven shaft has been frictionally engaged thereto.

8. In a clutch,—a pair of concentric driving shafts adapted to rotate in opposite directions; a driven shaft; members associated with said driving shaft; a member associated with the driven shaft and positioned between the members on the driving shaft; means associated with the last mentioned member whereby the same can be brought into engagement with either of the other members independently, whereby a slippable connection between the driven and driving shaft is obtained; and positive transmission means associated with each of said members whereby the driven shaft can be unslippably connected to either of the driving shafts after the driven shaft has been slippably connected thereto.

In testimony whereof I have signed my name to this specification in the presence of two subscribing witnesses.

ALFRED BONOM.

Witnesses:
BENEDICT GOFFE,
PHILIP D. ROLLHAUS.